Figure 1:
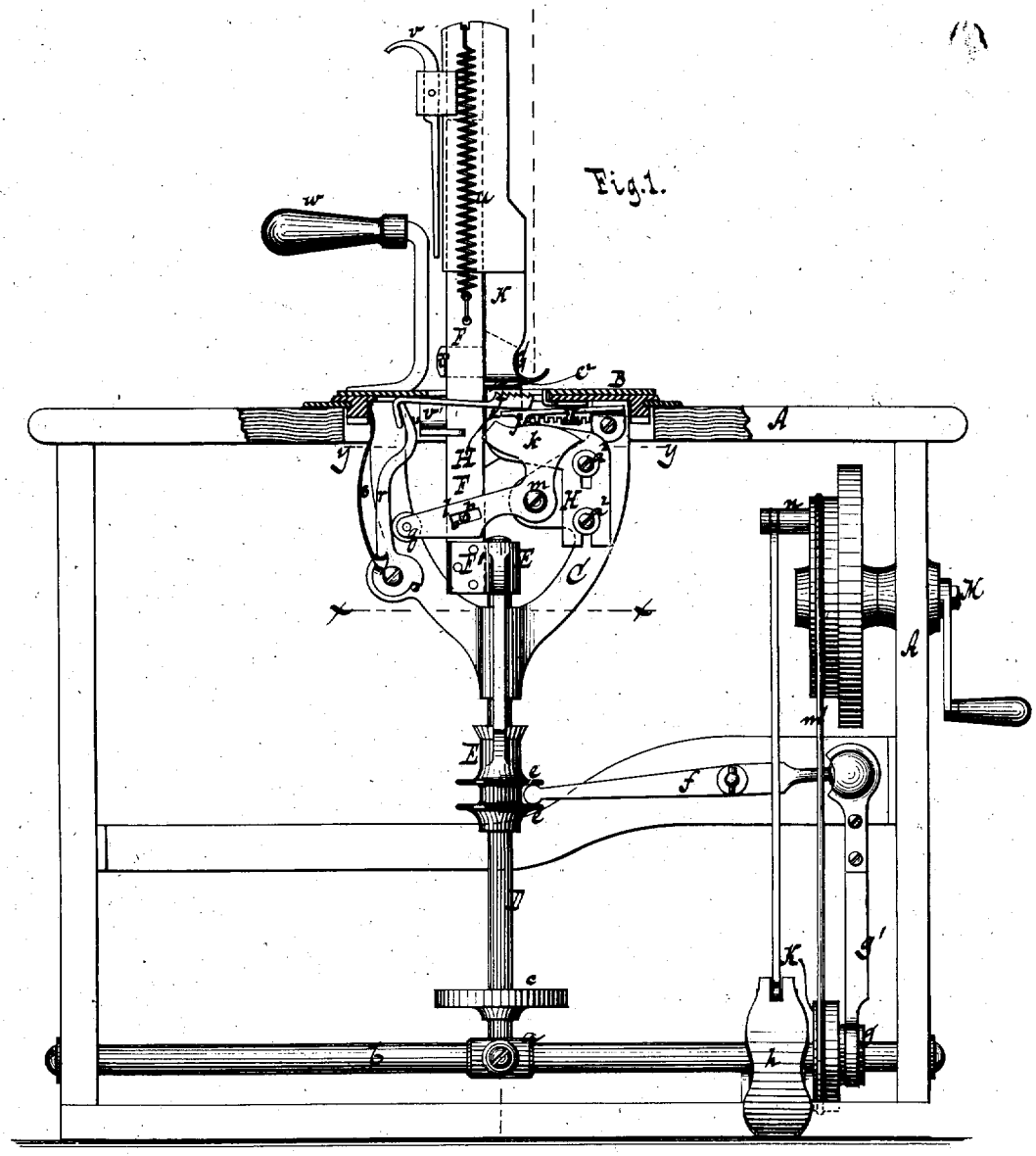

3 Sheets—Sheet 1.

A. WARTH.

Machine for Cutting Textile and other Materials.

No. 9,589. Reissued Feb. 22, 1881.

Witnesses
Otto Schupland
William Miller

Inventor
Albin Warth
by Van Santvoord & Hauff
his attys

A. WARTH.

Machine for Cutting Textile and other Materials.

No. 9,589. Reissued Feb. 22, 1881.

Witnesses,
~~Otto~~ Hufeland
William Miller

Inventor
Albin Warth
by Van Santvoord & Hauff
his attys

A. WARTH.

Machine for Cutting Textile and other Materials.

No. 9,589. Fig. 3. Reissued Feb. 22, 1881.

Witnesses
Otto Hufeland.
William Miller

Inventor
Albin Warth.
by Van Santvoord & Hauff
his attys

UNITED STATES PATENT OFFICE.

ALBIN WARTH, OF STAPLETON, NEW YORK.

MACHINE FOR CUTTING TEXTILE AND OTHER MATERIALS.

SPECIFICATION forming part of Reissued Letters Patent No. 9,589, dated February 22, 1881.

Original No. 106,101, dated August 2, 1870; Reissue No. 5,004, dated July 23, 1872; Reissue No. 5,186, dated December 10, 1872; Reissue No. 9,232, dated June 1, 1880. Application for reissue filed January 12, 1881.

*To all whom it may concern:*

Be it known that I, ALBIN WARTH, a citizen of the United States, residing at Stapleton, in the county of Richmond, State of New York, have invented new and useful Improvements in Machines for Cutting Textile and other Materials, of which the following is a specification.

This invention relates to a machine intended for cutting cloth, muslin, paper, leather, or other materials used in the manufacture of garments or shoes.

The machines in use previous to this invention for cutting such materials were operated almost exclusively by hand, applied to a handle connected directly with the blade or cutting-instrument, so that one cut was made for every movement of the handle, and consequently the number of cuts made in a given time was limited by the number of movements that could be made by the hand of the operator within the said time, while the only force that could be applied to the cutting-instrument was that developed by the hand of the operator. A machine had been devised to cut the material in sheets by power by means of a revolving circular knife or cutter; but in this case the cutter could not be turned or swiveled to make the direction of its cutting-edge correspond with the direction of the line to be cut; hence the machine was not adapted to general use. Another machine had been devised to cut such materials by means of a reciprocating knife operated by power, said knife being fitted to be turned laterally or swiveled while it was reciprocated; but the machine (so far as I can ascertain) never came into general use for the lack, among other things, (in my opinion,) of a direct connection between the knife and the movable cloth-support which held the material for the action of the knife.

The object of the invention which constitutes the subject of this patent is to enable textile and other materials, in flat sheets, to be cut according to any desired pattern or design with speed and by other power than the human hand, so that the cutting device or knife may be driven with a greatly higher speed than is attainable when the number of cuts corresponds with the motions of the hand, and that the quantity of cutting effected may be correspondingly increased.

To this end the invention consists of certain combinations of mechanical devices, of which combinations the following are the principal members, viz: A table upon which the material to be cut up may be supported in sheets; a laterally turning or swiveling platform which is capable of turning laterally or swiveling relatively to the table, and which, while beneath the position of the cloth, maintains the device which carries the knife-body and the knife or cutter in an upright position above the cloth; a laterally turning or swiveling cloth-support which is capable of being swiveled or turned laterally relatively to the table, and which supports a portion of the material near the knife or cutter, and sustains the particular part of the material on which the cutting-edge is operating close to the plane of motion of said edge, so as to prevent it from escaping from the action of said edge, the swiveling characteristic of this cloth-support permitting it and the bar which holds the knife and the knife, both of which are maintained in an upright position by it or by a part of it, to be swiveled or turned laterally, so as to accommodate the direction of the cutting-edge to the direction in which the cut is to be made; a movable knife or cutting-instrument whose edge has a cutting motion relatively to the platform and to the swiveling cloth-support, for the purpose of cutting the material; an upright bar which projects upward from the platform and swiveling cloth-support, and combines the knife with them, so that whenever the platform and cloth-support are swiveled the knife is compelled to swivel correspondingly. As the swiveling platform and cloth-support are always below the material to be cut while the body of the knife is above the material, this upright bar is, of necessity, arranged close to the knife, or in its vicinity, and so that it will pass edgewise through the cut or slit cut in the material by the action of the cutting-edge. The said bar also holds the knife with the plane of its body upright or at right angles, or thereabout, to the surface of the table by which the material to be cut is supported, and to the surface of the platform and swiveling cloth-support when the cutting-edge severs the material. A driving-pulley which may be caused to revolve at a high speed by means other than the human hand, and which, while revolving, is stationary or has a fixed relationship to the table, through which pulley the power employed is transmitted to the knife, so that by reason of the high speed of said pulley the knife-edge may be driven or caused to move with a high speed; a handle secured to the swiveling platform and cloth-support, and located above the position of the material to be cut, the said handle enabling the operator to apply one hand over the material, so as to turn the cloth-support and knife laterally or swivel them, as required, according to the direction in which the cut is to be made; a clearer for removing fibers and particles from the track of the knife-edge; a feed-dog for moving the material; a presser-foot for holding down the material, and lateral projections upon the cloth-support for throwing off the material or spreading its edges after it is cut.

The various combinations of the above and other devices which constitute my invention are pointed out in the claims at the close of this specification.

In order that these combinations may be fully understood, I have represented the same in the accompanying drawings, in which—

Figure 2:
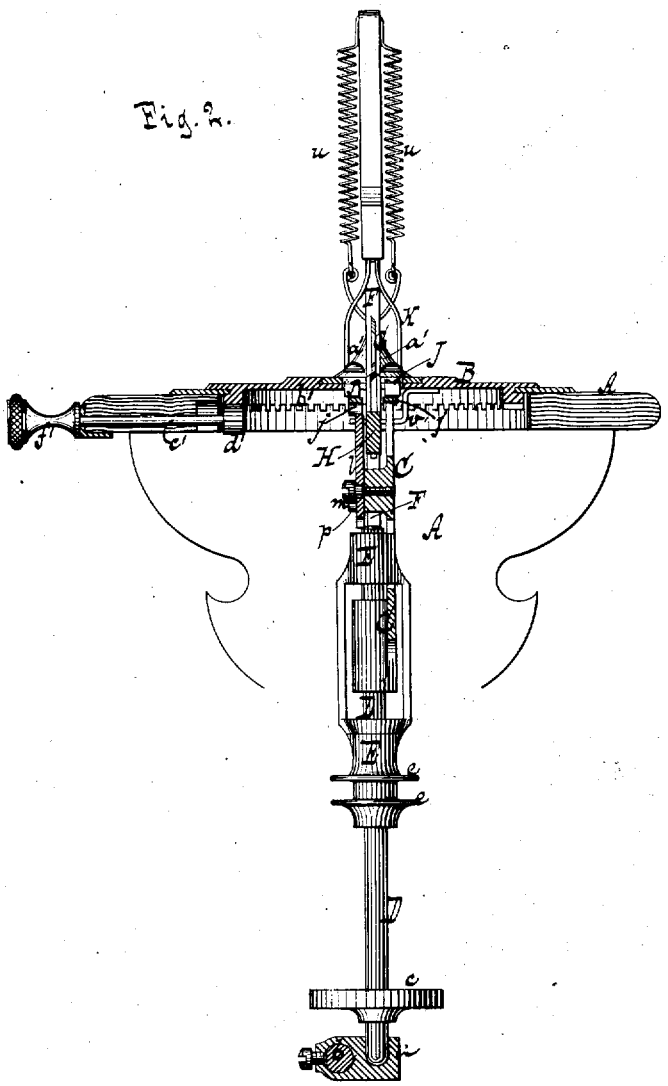
Figure 2:
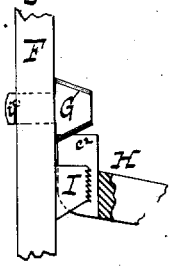
Figure 4:
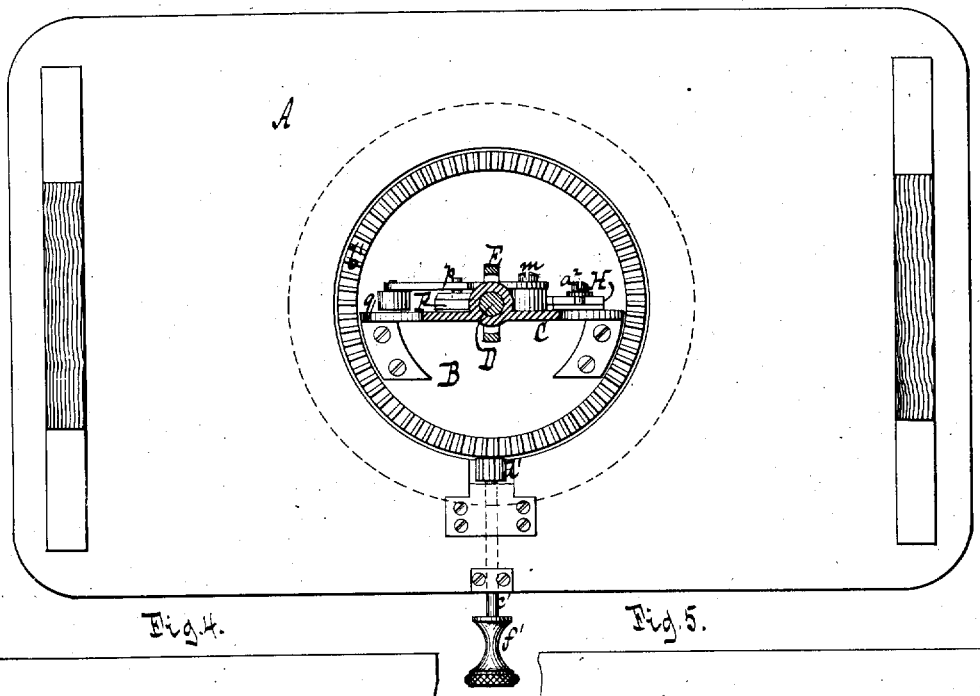
Figure 5:
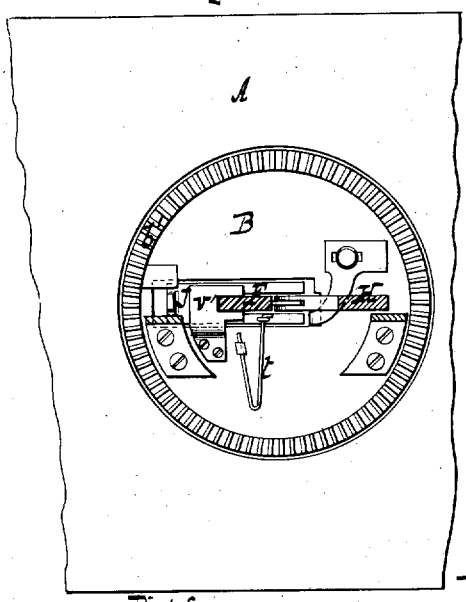
Figure 6:
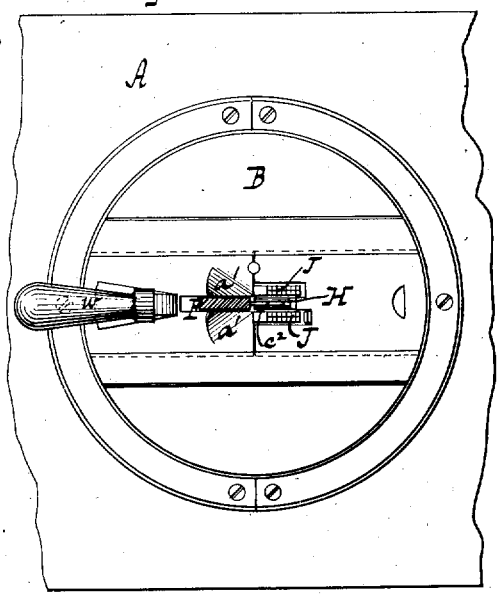
Figure 7:
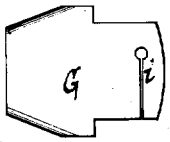
Figure 8:
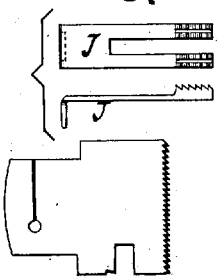

Figure 1 represents a sectional front view of the invention. Fig. 2 is a transverse section of the same. Fig. 2* is a sectional side view of the cutter, the support for the material to be cut, and the clearer. Fig. 3 is an inverted sectional plan of the same, the line *x x*, Fig. 1, indicating the plane of section. Fig. 4 is a similar view thereof, the plane of section being indicated by the line *y y*, Fig. 1. Fig. 5 is a sectional plan or top view thereof. Fig. 6 is a detached view of the knife. Fig. 7 is a detached plan and side elevation of the feed-dog. Fig. 8 is a representation of a serrated knife.

Similar letters indicate corresponding parts.

In the drawings, the letter A designates a table, made of wood or other suitable material and of any desirable form or size, its upper surface being horizontal, so as to support the material to be cut. On this table is placed a circular platform, B, which is capable of being swiveled round in either direction. To this platform is secured the socket H, the edges of whose upper surface are close to the plane of motion of the knife G. The upper surfaces of the platform B and socket H jointly constitute, in this machine, the swiveling cloth-support by which the part of the cloth in the vicinity of the knife and upon which the cutting-edge is operating is sustained or held from escaping from its action.

From the bottom surface of the platform B extends a hanger, C, carrying a rod, D, that is stepped in a bearing, *a*, secured to a rod, *b*, which is fastened between the legs of the table A. The rod D is firmly secured to the hanger C, and on its lower part is mounted a foot-piece, *c*, so that the operator can turn the hanger and the platform with the socket in either direction by the action of his foot, the platform B being fitted into the table A, so that it can be readily swiveled round its own center. The rod D forms a guide for the sleeve E, from the top part of which extends upward a flat bar, F, intended to carry the knife G. This bar is connected laterally with the platform by means of the bracket-piece *v'*, so that the first two are compelled to swivel simultaneously, and the bar F is maintained in an upright position relatively to the cloth-support and table. As the platform B forms part of the swiveling cloth-support B H, this support and the knife which the bar carries are combined by said upright bar F, so that in whatever direction the swiveling cloth-support is turned laterally or swiveled the knife is compelled to turn in the same direction, whereby its edge is maintained always in the line of the cut to be made. As this upright bar combines the body of the knife above the position of the material to be cut with the swiveling platform and swiveling cloth-support beneath that position, said bar is necessarily close to the knife, or in its vicinity, and it is also edgewise to the line of cut, so that it will pass readily between the edges of the cut made by the knife-edge. As the bar F, which holds the knife, is itself held steady in an upright position relatively to the table by the platform and the swiveling cloth-support, the said swiveling platform and the swiveling cloth-support, of which the platform is a part, each maintains the bar and knife attached thereto in an upright position relatively to the table, and dispenses with the necessity of employing for this purpose some other support which is extraneous of the table.

The knife of the machine represented in the drawings is adapted to be worked up and down or reciprocated through the intervention of the bar F. Hence the bar F is fitted to slide up and down in the bracket-piece *v'* of the platform; and on the lower end of the sleeve E (with which the bar F is connected) are secured two flanges, *e e*, which straddle the end of a lever, *f*, to which an oscillating motion is imparted by an eccentric, *g*, or by any other suitable mechanism. As the lever *f* oscillates, it imparts to the sleeve E and bar F a reciprocating rising and falling motion. The eccentric *g* revolves on the rod *b*, motion being imparted to it by hand, foot, or any other power, through the intervention of the driving-pulley K, which, being fitted to revolve on the rod *b*, has a stationary or fixed relationship to the surface of the table A while the sheet of cloth upon the table is being cut. If foot-power is used, I employ a treadle, *h*, which is hung at or near the center of its length, so that motion can be imparted to it in one direction by depressing the toes of the foot, and in the other direction by depressing the heel. The treadle operates the crank-pin $n$ of the crank-shaft M, from which the power is conveyed to the driving-pulley K by means of a belt, $m'$. The eccentric $g$, eccentric-rod $g'$, lever $f$, flanges $e$ $e$, sleeve E, and bar F constitute, in this machine, the combining mechanism between the knife (which swivels with the platform and cloth-support relatively to the table) and the driving-pulley K, (which, while revolving, has a fixed relationship to the table or is stationary,) so that the power exerted upon the fixed driving-pulley is transmitted to the knife, however it may be swiveled over the table, to cause its cutting-edge to correspond with the direction of the line to be cut in the material.

The knife G is stamped out of sheet metal, in the form shown in Fig. 6. It presents a double cutting-edge, so that it may be removed and reversed, and on its back edge is formed a spring-catch, $i$, so that when the shank of the knife is pushed through its mortise in the bar F said spring will catch over the rear edge of the bar and retain the knife firmly in position. The knife is held by said bar with the plane of the knife-body upright or at right angles to the surface of the table A, on which the material to be cut is supported, and in the same position relatively to the swiveling cloth-support, composed of the platform B and socket H. As the knife descends it enters the socket H, which is firmly connected with the turning platform B by being secured to the hanger C, and the top of which presents double cutting-edges, either of which is brought into operation, according to the position of the knife. The material to be cut, on being fed over the swiveling platform and under the knife, rests upon the top of the socket, close to the plane of movement of the cutting-edge of the knife, and as the knife descends the material is cut by the action of the cutting-edge of the knife operating upon the material supported crosswise beneath it by the edges of the socket. The socket is secured to the hanger C by set-screws $a^2$ $a^2$, passing through slots $b^2$ $b^2$, Fig. 1, so that the vertical relationship between the upper surface of the socket (which is a part of the swiveling cloth-support) and the body of the knife may be adjusted to place the surface of the swiveling cloth-support, which is close to the track of the cutting-edge, in the proper vertical relationship to that edge, notwithstanding the wearing away of the knife-edge by grinding it.

In the socket works the clearer I, which is firmly secured to the bar F, and passes into the socket from below. (See Fig. 2.) By the action of this clearer all fibers and small particles which are liable to become disengaged from the material to be cut during the operation of cutting are pushed out of the socket, and thereby the socket is prevented from becoming choked. The action of the clearer is improved by making its edge serrated.

In order that the platform may be conveniently swiveled by the hand, applied above the material to be cut, the handle $w$ is secured to the platform and serves to turn the same, together with the entire cutting mechanism, in either direction, as the pattern to be cut may demand. This handle, as shown in the drawings, is arranged above the position which the material to be cut occupies on the table and on the swiveling cloth-support B H.

The material to be cut is fed to the knife by the action of a feed-dog, J, detached views of which are shown in Fig. 7. This feed-dog straddles the bar F, and its serrated front end is supported by a lever, $j$, Fig. 1, which is pivoted at one end to the hanger C, while its loose end bears upon the cam-shaped end $k$ of a bell-crank lever, $k$ $l$. This bell-crank lever has its fulcrum on a pivot, $m$, secured in a bracket attached to the hanger C, and its arm $l$ is provided with a slot, $o$, which straddles a pin, $p$, secured in the bar F. In the end of the arm $l$ is secured a friction-roller, $q$, that bears against the edge of a lever, $r$, said lever being pressed up against the friction-roller by a spring, $s$. (See Fig. 1.) The upper end of the lever $r$ supports the hook-shaped tail end of the feed-dog J, and said lever is curved, so that when the friction-roller rises it imparts to the lever $r$ an oscillating motion, and thereby the feed-dog is carried forward toward the knife G; but before this forward motion of the feed-dog takes place the cam-shaped end of the arm $k$ of the elbow-lever causes the lever $j$, and with it the feed-dog J, to rise, so that the teeth of said feed-dog will take hold of the material to be cut and be in position to carry said material along when the forward motion of the feed-dog takes place. A spring, $t$, (see Fig. 4,) which acts on the feed-dog, serves the double purpose of keeping the serrated end of the same down upon the lever $j$, and of pressing the hook-shaped end of said feed-dog up against the lever $r$. When the bar F rises, therefore, the feed-dog is first caused to take hold of the material, and then it receives the forward motion, thereby carrying the material under the knife, and when the bar F descends the feed-dog is caused to drop and then to recede, ready for a new move.

The bar F is extended a certain distance beyond the mortise intended to receive the knife, so that the upper end of said bar may form the guide for the tubular shank of the presser-foot K. This presser-foot straddles the knife, and it is depressed by the action of two springs, $u$ $u$, one on each side, so as to produce a uniform action. These springs are hitched at their bottom ends to a wire passing through or fastened in the bar F, and their upper ends catch over the top edge of the tubular shank of the presser-foot. By the action of the presser-foot the material to be cut is kept down upon the platform during the time the cutting takes place, and at the moment the feed motion takes place the presser-foot is raised sufficiently to allow the material to be fed without obstruction. The presser-foot can be raised by means of a handle, *v*, which is hinged to its shank, and which also acts as a stop to retain the foot in its elevated position. For this purpose it is brought to bear upon the edge of a handle, *w*.

From the platform B rise two mold-board-like flanges, *a'*, one on each side of the bar F, and close to the same, for the purpose of throwing off the material after it has been cut, and preventing the same from crowding against the sides of the bar F.

The platform B is provided at its under surface with a circular rack, *b'*, (see Figs. 2, 3, and 4,) and through the edge of the table A extends a rod, *c'*, which carries at its inner end a pinion, *d'*, and at its outer end a handle, *f'*, and which is below the surface of the table. By pushing in this rod the pinion *d'* is thrown in gear with the rack *b'*, and the platform B can be swiveled or turned laterally by turning the handle *f'*, in place of being turned by the handle *w* or by the foot-piece *c*, as before described.

The material to be cut is adjusted on the swiveling cloth-support, (composed of the platform B and socket H,) under the presser-foot, and by imparting to the cutter-bar a reciprocating motion the operation of cutting is effected.

If the knife is to follow a curved path and the piece to be cut is small, the swiveling cloth-support may remain stationary, and the material can be turned as required; but if the piece from which a certain pattern is to be cut out is large and cannot be conveniently turned, then I turn the swiveling cloth-support, either by hand or by foot, causing the knife to follow the outlines of the pattern previously marked on the material.

This machine is principally intended for large clothing-manufacturers, and it is capable of cutting at one operation through twenty or more thicknesses of cloth or other textile fabrics, or through a still larger number of thicknesses of paper, or through several thicknesses of leather. The manipulation of the machine is quite simple, and its operation is exceedingly rapid, so that it produces a great saving in hand-labor.

It must be remarked that for different kinds of work the knife may be changed. It may, for instance, be made to act as a punch or a button-hole cutter, or as a cutter of any other description. Thus, for example, the knife may be made with a serrated or saw edge, as represented at Fig. 8, which represents a cutter that was filed in the United States Patent Office with my model when making my application for the original patent.

What I claim as new, and desire to secure by Letters Patent, is—

1. The combination, substantially as before set forth, of the table, the swiveling platform, the upright knife, the bar which projects upward from the surface of the platform close to the knife, combines the knife and the swiveling platform, and compels the two to swivel simultaneously, and the driving-pulley, which has a fixed relationship to the table during the cutting.

2. The combination, substantially as before set forth, of the table, the swiveling platform, the upright knife, the bar which projects upward from the surface of the platform close to the knife, combines the knife and the swiveling platform, and compels the two to swivel simultaneously, the handle above the material to be cut, and the driving-pulley, which has a fixed relationship to the table during the cutting.

3. The combination, substantially as before set forth, of the table, the swiveling cloth-support which supports the material against the action of the knife-edge, the upright knife, the bar which projects upward from the surface of the platform close to the knife, combines the knife with the swiveling cloth-support, and compels the two to swivel simultaneously, and the driving-pulley having a fixed relationship to the table during the cutting.

4. The combination, substantially as before set forth, of the table, the swiveling cloth-support which supports the material to be cut against the knife-edge, the upright knife, the bar which projects upward from the surface of the platform close to the knife, combines the knife with the swiveling cloth-support and compels the two to swivel simultaneously, the handle arranged above the position of the material to be cut, and the driving-pulley having a fixed relationship to the table during the cutting.

5. The combination, substantially as before set forth, of the table, the swiveling cloth-support which supports the material to be cut against the knife-edge, the upright knife, the bar which projects upward from the surface of the platform close to the knife, combines the knife with the swiveling cloth-support and compels the two to swivel simultaneously, the adjusting-screws which enable the vertical relationship of the knife-socket and the support of the material close to the plane of motion of the knife-edge to be varied, and the driving-pulley having a fixed relationship to the table during the cutting.

6. The combination, substantially as before set forth, of the table, the swiveling cloth-support, the upright knife, the bar which combines the knife with the swiveling cloth-support and compels the two to swivel simultaneously, and the clearer.

7. The combination, substantially as before set forth, of the table, the swiveling cloth-support, the upright knife, the bar which combines the knife with the swiveling cloth-support and compels the two to swivel simultaneously, and the feed-dog.

8. The combination, substantially as before set forth, of the table, the swiveling cloth-support, the upright knife, the bar which combines the knife with the swiveling cloth-support and compels the two to swivel simultaneously, and the presser-foot.

9. The combination, substantially as before set forth, of the table, the swiveling cloth-support, the upright knife, the bar which combines the knife with the swiveling cloth-support and compels the two to swivel simultaneously, and the projections for throwing off the material after it is cut.

10. The combination, substantially as before set forth, of the table, the swiveling cloth-support, the upright knife, the bar which combines the knife with the swiveling cloth-support and compels the two to swivel simultaneously, and the handle arranged on a rod below the surface of the table.

In testimony whereof I have hereunto set my hand and seal this 31st day of December, 1880.

ALBIN WARTH. [L. S.]

Witnesses:
W. C. HAUFF,
J. HERMANN WAHLERS.